W. T. DOREMUS.
Springs for Chairs, &c.

No. 144,020.  Patented Oct. 28, 1873.

Witnesses:
A. W. Almqvist
Alex T. Roberts

Inventor:
W. T. Doremus
Per Munn & Co
Attorneys.

UNITED STATES PATENT OFFICE.

WILLIAM T. DOREMUS, OF NEW YORK, N. Y.

IMPROVEMENT IN SPRINGS FOR CHAIRS, &c.

Specification forming part of Letters Patent No. 144,020, dated October 28, 1873; application filed September 27, 1873.

*To all whom it may concern:*

Figure 1:
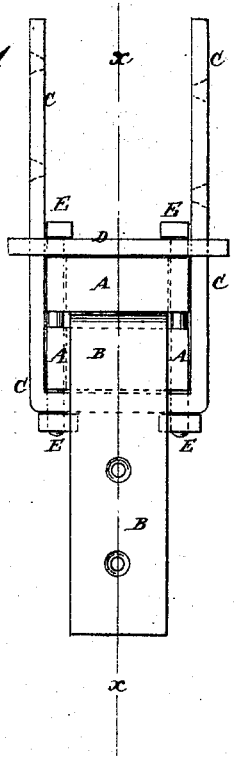
Figure 2:
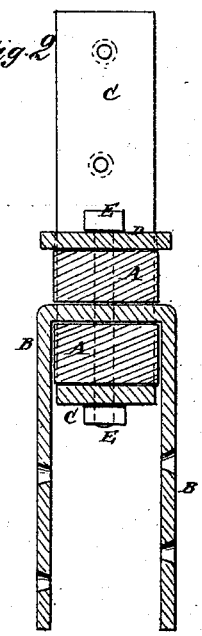
Figure 3:
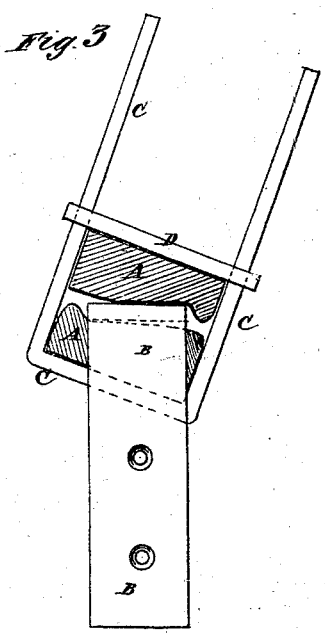
Figure 4:
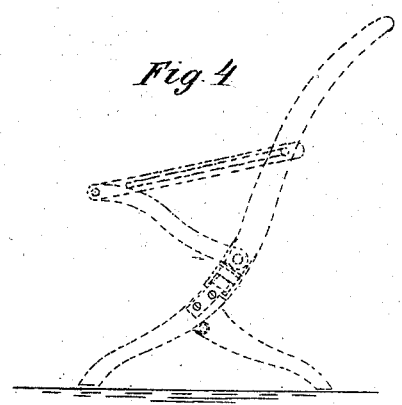
Figure 5:
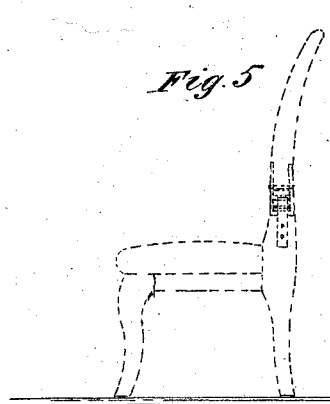

Be it known that I, WILLIAM T. DOREMUS, of the city, county, and State of New York, have invented a new and useful Improvement in Springs, of which the following is a specification:

Figure 1 is a side view of my improved spring. Fig. 2 is a longitudinal section of the same, taken through the line $xx$, Fig. 1. Fig. 3 is a side view of the same, illustrating its operation. Figs. 4 and 5 are views illustrating two applications of the spring.

Similar letters of reference indicate corresponding parts.

My invention has for its object to furnish an improved spring for use upon chairs and other articles of furniture, and for other purposes, and which shall be simple in construction, conveniently applied, and readily adjusted to give it any desired tension. The invention consists in an improved spring, formed by the combination with each other of the two rubber blocks, the U-bar interposed between the rubber blocks, the U-bar passing around the rubber blocks, the yoke or plate, and the bolts or equivalents, as hereinafter fully described.

A are two rubber blocks, between which is placed the middle part of a U-shaped bar, B. C is another U-shaped bar, the middle part of which is passed between the arms of the bar B, and which thus passes around both the rubber blocks A, as shown in Figs. 1 and 2. D is a plate or yoke, which passes along the upper side of the upper block A, between the arms of the bar C, and the ends of which are notched to receive the arms of the said bar C. The various parts of the spring are connected and held in place by two bolts, E, which pass through the yoke D, through notches in the ends of the rubber blocks A, and through the middle part of the U-bar C. By this construction, by tightening and loosening the nuts of the bolts E, the tension of the spring may be regulated as required. The parts of the spring may be arranged in different ways without departing from my invention. The arms of the bar C may be made short, and may have the bolts E formed upon them to pass through holes in the yoke or plate D, and be secured by nuts. In this case, the ends of the bar D should be extended for securing the spring in place, and the separate bolts E may be omitted. This construction adapts the spring for use in connecting a chair-seat to its pedestal; or the arms of the bar C or B may be bent outward horizontally, or at any desired angle, as the use to which the spring is to be applied may require.

In Fig. 4 the spring is shown as being applied to give elasticity to a camp-chair, and in Fig. 5 it is shown as being applied to give elasticity to the back of an ordinary chair.

The spring may also be employed with advantage in various other kinds of chairs, in other articles of furniture, and for various other uses, which it is not necessary to enumerate.

Having thus described my invention, I claim as new and desire to secure by Letters Patent—

An improved spring, formed by the combination with each other of the two rubber blocks A, the U-bar B, interposed between the blocks A, the U-bar C, passing around both blocks A, the yoke or plate D, and the bolts E, or equivalent, substantially as herein shown and described.

WILLIAM T. DOREMUS.

Witnesses:
JAMES T. GRAHAM,
T. B. MOSHER.